United States Patent
Binder et al.

(10) Patent No.: US 6,465,025 B2
(45) Date of Patent: Oct. 15, 2002

(54) AQUEOUS LYSINE-CONTAINING ANIMAL FEED SUPPLEMENTS AND PROCESS FOR THE PRODUCTION THEREOF

(75) Inventors: Michael Binder, Steinhagen; Klaus-Erich Uffmann, Bielefeld, both of (DE)

(73) Assignee: Degussa-Huls Aktiengesellschaft, Hanau (DE)

(*) Notice: Subject to any disclaimer, the term of this patent is extended or adjusted under 35 U.S.C. 154(b) by 0 days.

(21) Appl. No.: 10/026,959

(22) Filed: Dec. 27, 2001

(65) Prior Publication Data

US 2002/0106421 A1 Aug. 8, 2002

Related U.S. Application Data

(63) Continuation-in-part of application No. 09/599,644, filed on Jun. 23, 2000, now Pat. No. 6,340,486.
(60) Provisional application No. 60/140,449, filed on Jun. 23, 1999.

(51) Int. Cl.[7] ............................... A23J 3/20; A23K 1/00
(52) U.S. Cl. ............................ 426/2; 426/61; 426/656; 426/807
(58) Field of Search ............................. 426/2, 61, 656, 426/807

(56) References Cited

U.S. PATENT DOCUMENTS

| 3,616,218 A | 10/1971 | Shiio et al. ............... 195/29 |
| 4,327,118 A | 4/1982 | Georgen et al. ............ 426/656 |
| 5,431,933 A | 7/1995 | Binder et al. ............... 426/60 |
| 5,622,710 A | 4/1997 | Binder et al. ............. 424/438 |
| 6,017,555 A | 1/2000 | Stevens et al. ............ 424/438 |
| 6,340,486 B1 | 1/2002 | Binder et al. ............... 426/2 |

FOREIGN PATENT DOCUMENTS

| EP | 0 533 039 | | 3/1993 |
| EP | 0534865 | * | 3/1993 |
| EP | 0 923 878 | | 6/1999 |
| GB | 1 439 121 | | 6/1976 |
| GB | 1 439 728 | | 6/1976 |
| SU | 183581 | * | 6/1965 |

* cited by examiner

*Primary Examiner*—Chhaya D. Sayala
(74) *Attorney, Agent, or Firm*—Pillsbury Winthrop LLP

(57) ABSTRACT

The invention relates to aqueous L-lysine-containing animal feed supplements, which optionally contain inactivated microorganisms from fermentation and have a pH value greater than 4 and less than 5 and to a process for producing this preparation.

11 Claims, No Drawings

US 6,465,025 B2

AQUEOUS LYSINE-CONTAINING ANIMAL FEED SUPPLEMENTS AND PROCESS FOR THE PRODUCTION THEREOF

CROSS-REFERENCE TO RELATED APPLICATIONS

This application is a continuation-in-part of U.S. application Ser. No. 09/599,644, now U.S. Pat. No. 6,340,486 filed on Jun. 23, 2000. It also claims priority to U.S. provisional application No. 60/140,449, filed on Jun. 23, 1999, which is hereby incorporated by reference.

FIELD OF THE INVENTION

The invention relates to aqueous L-lysine-containing animal feed supplements, which optionally inactivated microorganisms from the fermentation process, and a process for the production of such supplements.

BACKGROUND OF THE INVENTION

The essential amino acid L-lysine is widely used as an animal feed supplement. It is known that L-lysine is produced by fermentation of strains of coryneform bacteria, in particular *Corynebacterium glutamicum*. Due to its great significance, efforts are constantly being made to improve the production process. Improvements to the process may relate to the intrinsic performance characteristics of the microorganisms (e.g., by mutagenesis and selection), to measures concerning fermentation technology (e.g., stirring and oxygen supply), to the composition of the nutrient media (e.g., sugar concentration during fermentation), or to ways in which product is purified or prepared (e.g., ion exchange chromatography or crystallisation).

According to the prior art, there are three different groups of L-lysine-containing product presentations which are produced from fermentation broths. The best known group comprises pulverulent or crystalline product presentations obtained from cleaned-up or pure L-lysine, which is typically present in the form of a salt such as, for example, L-lysine monohydrochloride. Another group of solid product presentations, (see e.g., EP-B-0533039), contain, in addition to L-lysine, the feedstock used during fermentative production and, optionally, the inactivated biomass of the microorganism used. These types of solid products often exhibit clear disadvantages with regard to handling properties and application. For example, the quality of the product may be influenced to a considerable extent by the weather (high air humidity levels may cause caking which impairs the shelf life and dispensing properties of the product). In addition, the processing of dry, pulverulent L-lysine-containing products may lead to undesirable dust development.

The third group of L-lysine-containing products comprises concentrated, aqueous, alkaline solutions. These avoid the above-mentioned problems (EP-B-0534865).

Many different processes are known for producing L-lysine-containing products from L-lysine-containing fermentation broths. There are essentially two different processes currently known for producing solid, pure L-lysine. Lysine may be obtained as a monohydrochloride (Lys-HCl) by crystallisation from the corresponding fermentation broths, after the inactivated biomass has been separated off by suitable methods. Cleaning-up of the filtrate prior to further concentration is performed, in general, by ion exchange chromatography over several stages. Typically, fermentation broth separated from the biomass is acidified, preferably by the addition of hydrochloric acid (HCl) or sulfuric acid ($H_2SO_4$), to ease adsorption of the lysine on to ion-exchange resins. One problem with this is that, in addition to L-lysine, various other cations are present in the fermentation broth which are also bound. The adsorbed lysine is then preferably eluted by an ammoniacal solution and the ion-exchange column is regenerated. The lysine solution obtained in this way is then concentrated and lysine-HCl is obtained in crystalline form after neutralisation with hydrochloric acid. In general, a variety of ion-exchange columns connected in sequence are necessary for obtaining a pure product.

Another method enables lysine to be obtained in the form of a crystalline salt after purifying with activated carbon (SU-183581). The lysine-containing fermentation broth is inactivated by standard processes using moist heat and separated from the biomass by filtration. After acidification of the filtrate to pH 5, 4–5% activated carbon is added with constant stirring at 50–55° C., in order to separate off undesirable impurities from the filtrate and to prevent discoloration of the crystallizate. In a further filtration step, the activated carbon is separated off and the dissolved sulfate is then precipitated as calcium sulfate by the addition of calcium hydroxide. This is filtered off, the ammonia is removed in a rotary evaporator under vacuum and the solution is concentrated until crystallisation occurs on cooling.

The disadvantage of these two preparation methods lies in the numerous individual stages and the complex cleaning processes using ion-exchange chromatography. The elimination of troublesome salts or the use of different elution media creates additional waste streams, which must either be cleaned up by complex methods or disposed of.

EP-B-0533039 avoids these disadvantages in that all the fermentation feedstock, optionally including the biomass, is concentrated and spray-dried at elevated temperature.

U.S. Pat. No. 5,990,350 describes a process for producing biomass-free L-lysine-containing granules. In this process, the biomass is first isolated from the fermentation broth by ultrafiltration and discarded. The filtrate recovered in this way is then concentrated by extensive evaporation of the water content. The concentrate obtained in this way is finally dried and worked up in a complex manner by fluidised bed spray granulation to produce granules.

A process is also known from EP-B-0534865 for producing aqueous, basic, L-lysine-containing solutions from fermentation broths in which biomass is separated from the fermentation broth and discarded. A pH value of between 9 and 11 is established using a base such as sodium, potassium or ammonium hydroxide. The mineral constituents (inorganic salts) are separated from the broth by crystallisation after concentration and cooling and either used as fertiliser or discarded (land-filled).

OBJECT OF THE INVENTION

The object of the invention is to provide novel, aqueous preparations of L-lysine and its salts suitable as a feed supplement. In addition, it is an object of the invention to provide a production process that is more economical and efficient than processes currently known.

DESCRIPTION OF THE INVENTION

The essential amino acid lysine is widely used as an animal feed supplement. Microorganisms of the genus Corynebacterium are distinguished by their capacity to secrete high concentrations of L-lysine into the corresponding fermentation medium over a relatively short period. The production processes are generally performed as fed batch processes. L-lysine produced by fermentation is currently predominantly worked up to produce a crystalline product, powder or granules.

The present invention provides an animal feed supplement derived from the fermentation broth of Coryneform bacteria, characterised in that it contains a) L-lysine and/or a salt thereof, preferably at a concentration of 18–35 weight percent (calculated on the basis of lysine base), b) the biomass formed during fermentation in an amount of from 0 to 100%, preferably from 50 to 100% and more preferably from 90 to 100%, and c) preferably, greater than 50% of the other dissolved and suspended constituents of said fermentation broth.

The animal feed supplement is in the form of an aqueous composition at a pH of greater than 4 and less than 5.

The animal feed supplement has a lysine content (as lysine base) of 10 wt. % to 35 wt. %, preferably 15 wt. % to 35 wt. %, particularly preferably 18 wt. % to 35 wt. % and very particularly preferably 21 wt. % to 34 wt. %, relative to the total amount of supplement. The pH is less than 7, preferably 2 to 6.5, particularly preferably 2.5 to 6 and very particularly greater than 4 and less than 5.

The total solids content of the supplement amounts to from 10 wt. % to 55 wt. %, preferably 20 wt. to 55 wt., particularly preferably 35 wt. % to 55 wt. % and very particularly preferably 45 wt. % to 54 wt. %. The solids content contains, in addition to lysine preferably the biomass of the producing microorganism, the inorganic and other organic constituents of the fermentation broth and the by-products produced during fermentation, insofar as they have not been separated off by suitable processes such as, for example, filtration.

If the biomass is left completely or partially in the supplement, the latter contains the microorganism protein in a concentration of up to a maximum of 4 wt. %. The supplement contains as inorganic constituents, inter alia, calcium, magnesium, phosphorus in the form of phosphate, and sulfur in the form of sulfate. As organic constituents I contains, inter alia, vitamins (e.g., biotin and thiamine) and sugars (e.g., isomaltose).

The organic by-products formed in small amounts during fermentation include L-amino acids selected from the group comprising L-alanine, L-asparagine, L-glutamine, L-methionine, L-threonine and L-valine. They additionally include organic acids which carry one to three carboxyl groups, such as lactic acid, acetic acid and malic acid. Finally, they also include sugars, such as trehalose. These compounds may be desirable if they improve the valency of the supplement.

The invention further provides a process for producing an aqueous animal feed additive (in the form of a solution or suspension) containing lysine or salts of lysine from a fermentation broth comprising:

(a) producing an L-lysine-containing broth by the fermentation of Coryneform bacteria;

(b) adjusting the pH of the broth to a value of greater than 4 and less than 5.; and (c) concentrating the broth obtained under vacuum; wherein the order of steps (b) and (c) is optional.

Mutant coryneform bacteria producing L-lysine are described in detail in the prior art, such as for example in U.S. Pat. No. 4,657,860. For the purpose of L-lysine production, these strains may be cultured continuously or discontinuously using the batch process or the fed batch process or the repeated fed batch process. A summary of known culture methods is given in the textbook by Chmiel (Bioprozesstechnik 1. Einführung in die Bioverfahrenstechnik (Gustav Fischer Verlag, Stuttgart, 1991)) or in the textbook by Storhas (Bioreaktoren und periphere Einrichtungen (Vieweg Verlag, Braunschweig/Wiesbaden, 1994)).

Examples of suitable fermentation media may be found in patent specifications EP-B-0 532 867, U.S. Pat. No. 5,840, 551 and 5,990,350. The culture medium to be used must satisfy the requirements of the particular strains. Carbon sources which may be used include sugars and carbohydrates (e.g., glucose, sucrose, lactose, fructose, maltose, molasses, starch and cellulose) oils and fats (e.g., soya oil, sunflower oil, peanut oil and coconut oil) fatty acids (e.g., palmitic acid, stearic acid and linoleic acid) alcohols (e.g., glycerol and ethanol) and organic acids (e.g., acetic acid). These substances may be used individually or as a mixture. Nitrogen sources which may be used include organic, nitrogen-containing compounds such as peptones, yeast extract, meat extract, malt extract, corn steep liquor, soya flour and urea or inorganic compounds such as ammonium sulfate, ammonium chloride, ammonium phosphate, ammonium carbonate and ammonium nitrate. The nitrogen sources may be used individually or as a mixture. Phosphorus sources which may be used include potassium dihydrogen phosphate and dipotassium hydrogen phosphate or the corresponding sodium-containing salts. The culture medium should additionally contain salts of metals, such as magnesium sulfate or iron sulfate, which are necessary for growth. Finally, essential growth-promoting substances, such as amino acids and vitamins, may be used in addition to the above-mentioned substances. Suitable precursors may furthermore be added to the culture medium. The stated feedstock substances may be added to the culture as a single batch or be fed appropriately during cultivation.

Basic compounds, such as sodium hydroxide, potassium hydroxide, ammonia, or acidic compounds, such as phosphoric acid or sulfuric acid, are used to control the pH of the culture. Foaming may be controlled using antifoaming agents such as fatty acid polyglycol esters. Plasmid stability may be maintained by the addition to the medium of suitable selectively acting substances, for example, antibiotics. The introduction of oxygen or oxygen-containing gas mixtures such as air into the culture and thorough mixing using suitable stirring systems or the gas stream may be used to maintain aerobic conditions. The temperature of the culture is typically 25° C. to 37° C. The culture is continued until the maximum quantity of L-lysine has formed. This aim is normally achieved within 10 to 160 hours.

Analysis of L-lysine may be performed by anion exchange chromatography with subsequent ninhydrin derivatisation, as described in Spackman et al. (*Analytical Chemistry*, 30:1190 (1958)) or it may be performed by reversed phase HPLC, as described in Lindroth et al. (*Analytical Chemistry* 51:1167–1174 (1979)). The fermentation broths used for the process according to the invention preferably have an L-lysine content greater than 60 g/L (as lysine base) for a content of non-metabolised sugar of less than 5.0 g/L. Out of a total solids content of >10 wt. %, the biomass preferably accounts for 1 to 4 wt. %. The content of by-products and vitamins from fermentation (amino acids, organic acids) is preferably less than 2 wt.

In the process according to the invention, the biomass present in the fermentation broth is generally inactivated or destroyed at the start, for example, by heat treatment.

Inactivation may optionally be dispensed with, however. A pH value of less than 7, preferably 2 to 6.5, particularly preferably 2.5 to 6 and very particularly preferably 2.5 to 5 is then established in the fermentation broth by means of an inorganic acid, such as sulfuric acid, hydrochloric acid or phosphoric acid, or an organic acid, such as citric acid, acetic acid or formic acid, or a mixture of different acids. The biomass is optionally separated off completely or partially by generally known separation or filtration methods before or after acidification. It is not generally necessary to separate off the mineral constituents. The acidic L-lysine-containing solution or suspension is then concentrated using known methods (such as for example a rotary evaporation, film evaporation or falling-film evaporation), preferably under vacuum, until a liquid product is obtained with a lysine content (as lysine base) of 10 wt. % to 35 wt. %, preferably 15 wt. % to 35 wt. %, particularly preferably 20 wt. % to 35 wt. % and very particularly preferably 21 wt. % to 34 wt. %, for a total solids content of 10 wt. % to 55 wt. %, preferably 20 wt. % to 55 wt. %, particularly preferably 35 wt. % to 55 wt. % and very particularly preferably 45 wt. % to 54 wt. %. It is generally the case that the broth is so concentrated that preferably no mineral constituents (inorganic salts) precipitate out of the fermentation broth and the lysine is present in solution. A desired concentration of L-lysine may optionally be established in the product by the addition of an L-lysine-containing substance at any process stage.

The solution/suspension obtained in this way has an acid pH value, is easy to transport, may be readily dispensed, is microbially stable and has a longer shelf life than an alkaline solution. The term "suspension" is used to indicate that the preferably inactivated microorganisms are present in the product in undissolved form.

Acidification may also be performed after or during concentration. The anions acting as sulfate, chloride, phosphate, citrate etc. may be added to the medium in the form of commercially available salts even prior to fermentation.

DETAILED DESCRIPTION OF THE INVENTION

The present invention is explained in more detail below with the aid of practical examples.

EXAMPLE 1

Production of an L-lysine-Containing Fermentation Broth

Fermentation processes for producing lysine-containing broths, which are worked up according to the invention, have been described in detail in various prior patents (EP-B 0 532 867 and U.S. Pat. No. 5,840,551).

EXAMPLE 2

Production of a Biomass-Free Product 20 kg of a fermentation broth with a lysine content of approximately 9.5 wt. % (as lysine base) were produced in accordance with Example 1. The biomass present in the fermentation broth was first inactivated by heat treatment for 30 minutes at 80° C. The inactivated biomass was then separated off by centrifuging for 20 minutes at 4000 rpm (Biofuge-Stratos laboratory centrifuge, Heraeus, Düsseldorf, Germany). 1.0 L of the supernatant purified in this way was adjusted to a pH value of approximately 4 by the stepwise addition of concentrated sulfuric acid. The liquid content of the centrifugate was then reduced under vacuum using a rotary evaporator (Büchi Rotavapor RE-120 laboratory rotary evaporator, Büchi-Labortechnik GmbH, Konstanz, Germany) to approximately 50% dry matter content.

The liquid product obtained in this way had an L-lysine content of 31.5 wt. % (as lysine base) and a pH value of 4. The total solids amounted to 49.3 wt. %.

EXAMPLE 3

Production of a Biomass-Containing Product 20 kg of a fermentation broth with a lysine content of approximately 9.5 wt. % (as lysine base) were produced in accordance with Example 1. The biomass present in the fermentation broth was inactivated directly in a bioreactor by heat treatment for 30 minutes at 80° C. 1.0 L of this biomass-containing fermentation broth then was adjusted to a pH value of approximately 4 by the stepwise addition of concentrated sulfuric acid. The liquid content of this acidic lysine-containing fermentation broth was then reduced under vacuum using a rotary evaporator (Büchi Rotavapor RE-120 laboratory rotary Evaporator, Büchi-Labortechnik GmbH, Konstanz, Germany) to approximately 50% dry matter content.

The liquid product obtained in this way had an L-lysine content of 21.8 wt. % (as lysine base) and a pH value of 4. The total solids amounted to 50.7 wt. %. No significant change in content was noted after 16 months storage at 20° C.

EXAMPLE 4

Production of a Biomass-Free Product with a pH of 4.5

20 kg of a fermentation broth with a lysine content of approximately 9.5 % by weight (as lysine base) was produced in accordance with Example 1. The biomass present in the fermentation broth was first inactivated by thermal treatment for 30 minutes at 80° C. The inactivated biomass was subsequently separated by centrifugation for 20 minutes at 4000 rpm (laboratory centrifuge Biofuge-Stratos, Heraus, Dusseldorf, Germany). 1.0 L of the supernatant clarified in this manner was adjusted by the gradual addition of sulfuric acid to a pH of approximately 4.5. The liquid component was subsequently reduced to approximately 50% dry content in the centrifuge on a rotary evaporator (laboratory rotary evaporator, Büchi Rotavapor, RE-120, Büchi-Labortechnik GmbH, Constance, Germany) under a vacuum.

The liquid product obtained in this manner had an L-lysine content of 31.6% by weight (as lysine base) and a pH of 4.5. The total dry mass was 49.4% by weight.

EXAMPLE 5

Production of a Product with pH 4.5 Containing Biomass 29 kg of a fermentation broth with a lysine content of approximately 9.5% by weight (as lysine base) was produced in accordance with Example 1. The biomass present in the fermentation broth was inactivated directly in the bioreactor by thermal treatment for 30 minutes at 80° C. 1.0 L of this fermentation broth containing biomass was subsequently adjusted by the gradual addition of sulfuric acid to a pH of approximately 4.5. The liquid component of this acidic, lysine-containing fermentation broth was subsequently reduced to approximately 50% dry content in a rotary evaporator laboratory rotary evaporator, Büchi Rotavapor, RE-120, Büchi-Labortechnik GmbH, Constance, Germany) under a vacuum.

The liquid product obtained in this manner had an L-lysine content of 21.9% by weight. After a storage of 16 months at 20° C. no significant change of the content could be determined.

EXAMPLE 6

Production of a Product with a pH 4.8 Containing Biomass 20 kg of a fermentation broth with a lysine content of approximately 9.5% by weight (as lysine base) was produced in accordance with Example 1. The biomass present in the fermentation broth was inactivated directly in the bioreactor by thermal treatment for 30 minutes at 80° C. 1.0 L of this fermentation broth containing biomass was subsequently adjusted by the gradual addition of concentrated sulfuric acid to a pH of approximately 4.8. The liquid component of this acidic, lysine-containing fermentation broth was subsequently reduced to approximately 50% dry content in a rotary evaporator (laboratory rotary evaporator, Büchi Rotavapor, RE-120, Büchi-Labortechnik GmbH, Constance, Germany) under a vacuum.

The liquid product obtained in this manner had an L-lysine content of 21.9% by weight (as lysine base) and a pH of 4.8. The total dry mass was 50.6% by weight. After a storage of 16 months at 20° C., no significant change of the content could be determined.

What is claimed is:

1. An animal feed supplement derived from the fermentation broth of Coryneform bacteria, comprising:
   (a) L-lysine or a salt of L-lysine; and
   (b) from 0–100% of the biomass formed during the fermentation of said Coryneform bacteria; and
   and wherein said animal feed supplement is in the form of an aqueous composition at a pH of greater than 4 and less than 5.

2. The animal feed supplement of claim 1, wherein said L-lysine or salt of L-lysine is present at a concentration of 18–35 weight percent, calculated on the basis of lysine based.

3. The animal feed supplement of either claim 1 or claim 2, further comprising greater than 50% of the dissolved and suspended constituents of said fermentation broth.

4. An animal feed supplement derived from the fermentation broth of Coryneform bacteria, comprising;
   (a) L-lysine or salts of L-lysine at a concentration of 18–35 weight percent, as lysine based;
   (b) from 0–100% of the biomass formed during the fermentation of said Coryneform bacteria; and
   (c) greater than 50% of the dissolved and suspended constituents of said fermentation broth;
   and wherein said animal feed supplement is in the form of an aqueous composition at a pH of greater than 4 and less than 5.

5. The animal feed supplement of claim 4, wherein said animal feed supplement consists of:
   (a) L-lysine or salts of L-lysine at a concentration of 18–35 weight percent, as lysine base;
   (b) from 0–100% of the biomass formed during the fermentation of said Coryneform bacteria; and
   (c) greater than 50% of the dissolved and suspended constituents of said fermentation broth;
   and wherein said animal feed supplement is in the form of an aqueous composition at a pH of greater than 4 and less than 5.

6. The animal feed supplement of any one of claim 1, 4 or 5, wherein said animal feed supplement comprises 50–100% of the biomass formed during the fermentation of said Coryneform bacteria.

7. The animal feed supplement of any one of claim 1, 4 or 5, wherein said animal feed supplement comprises 90–100% of the biomass formed during the fermentation of said Coryneform bacteria.

8. A process of producing an aqueous animal feed additive containing lysine or salts of lysine from a fermentation broth comprising the steps of:
   (a) producing an L-lysine-containing broth by the fermentation of Coryneform bacteria;
   (b) adjusting the pH of the broth to a value of greater than 4 and less than 5; and
   (c) concentrating the broth obtained under vacuum;
   wherein the order of steps (b) and (c) is optional.

9. The process of claim 8, further comprising separating the biomass from the fermentation broth of step (a).

10. The process of either claim 8 or 9, further comprising achieving a desired concentration in said feed additive by the addition of L-lysine.

11. A method of supplementing animal feed, comprising adding the animal feed supplement of any one of claim 1, 4 or 5.

* * * * *